United States Patent [19]

Goss et al.

[11] Patent Number: 4,796,791

[45] Date of Patent: Jan. 10, 1989

[54] CONSOLE FOR A VEHICLE

[76] Inventors: Ray J. Goss, 601 TCS, Box 183, Apo, N.Y. 09692-5360; George Spector, 233 Broadway RM 3815, New York, N.Y. 10007

[21] Appl. No.: 47,280

[22] Filed: May 8, 1987

[51] Int. Cl.$^4$ .................................... B60R 7/00
[52] U.S. Cl. .............................. 224/275; 224/42.42; 108/44; 108/144; 206/562; 248/650; 248/188.5
[58] Field of Search ............... 224/0.5, 245, 275, 247, 224/277, 279, 42.42, 42.43, 42.44, 242, 196; 215/100 A; 206/216, 217, 335, 560, 562, 563, 564, 565, 515, 517; 248/311.2, 525, 526, 188.4, 650, 157, 421, 422, 161; 108/44, 106, 144, 145; 312/290; 296/37.8, 37.1, 37.9, 37.11, 37.14; 280/727

[56] References Cited

U.S. PATENT DOCUMENTS

| | | | |
|---|---|---|---|
| 1,734,215 | 11/1929 | Kinard | 248/650 |
| 1,831,346 | 11/1931 | Dina | 248/650 |
| 1,907,754 | 5/1933 | Dina | 248/650 |
| 2,633,180 | 3/1953 | Reed | 224/275 X |
| 2,743,893 | 5/1956 | Johnson | 248/146 |
| 2,971,572 | 2/1961 | Watkins | 108/44 X |
| 3,061,394 | 10/1962 | Whetstone | 312/290 X |
| 3,110,397 | 11/1963 | Peck et al. | 224/42.42 R |
| 3,163,287 | 12/1964 | Barnett | 224/42.42 R |
| 3,177,033 | 4/1965 | Daniels | 296/37.8 |
| 3,216,678 | 11/1965 | Foedisch | 248/650 X |
| 3,338,629 | 8/1967 | Drees | 224/275 |
| 3,554,139 | 1/1971 | Rosner | 108/44 |
| 3,632,158 | 1/1972 | Boothe | 296/37.8 |
| 4,146,159 | 3/1979 | Hemmen | 224/275 |
| 4,300,709 | 11/1981 | Page, Jr. | 224/275 |
| 4,512,503 | 4/1985 | Gioso | 224/42.42 R |
| 4,520,981 | 6/1985 | Harrigan | 248/161 X |
| 4,619,386 | 10/1986 | Richardson | 224/277 |

FOREIGN PATENT DOCUMENTS

| | | | |
|---|---|---|---|
| 461685 | 12/1949 | Canada | 248/525 |
| 947003 | 8/1982 | U.S.S.R. | 206/562 |

*Primary Examiner*—Henry J. Recla
*Assistant Examiner*—Ernest G. Cusick

[57] ABSTRACT

A vehicle console is provided and consists of a base unit that will hold drinks, store a removable trash receptacle and contain an additional storage area for various articles. The vehicle console also includes a leveling mechanism and drink holding gripping devices therein.

2 Claims, 1 Drawing Sheet

U.S. Patent  Jan. 10, 1989  4,796,791
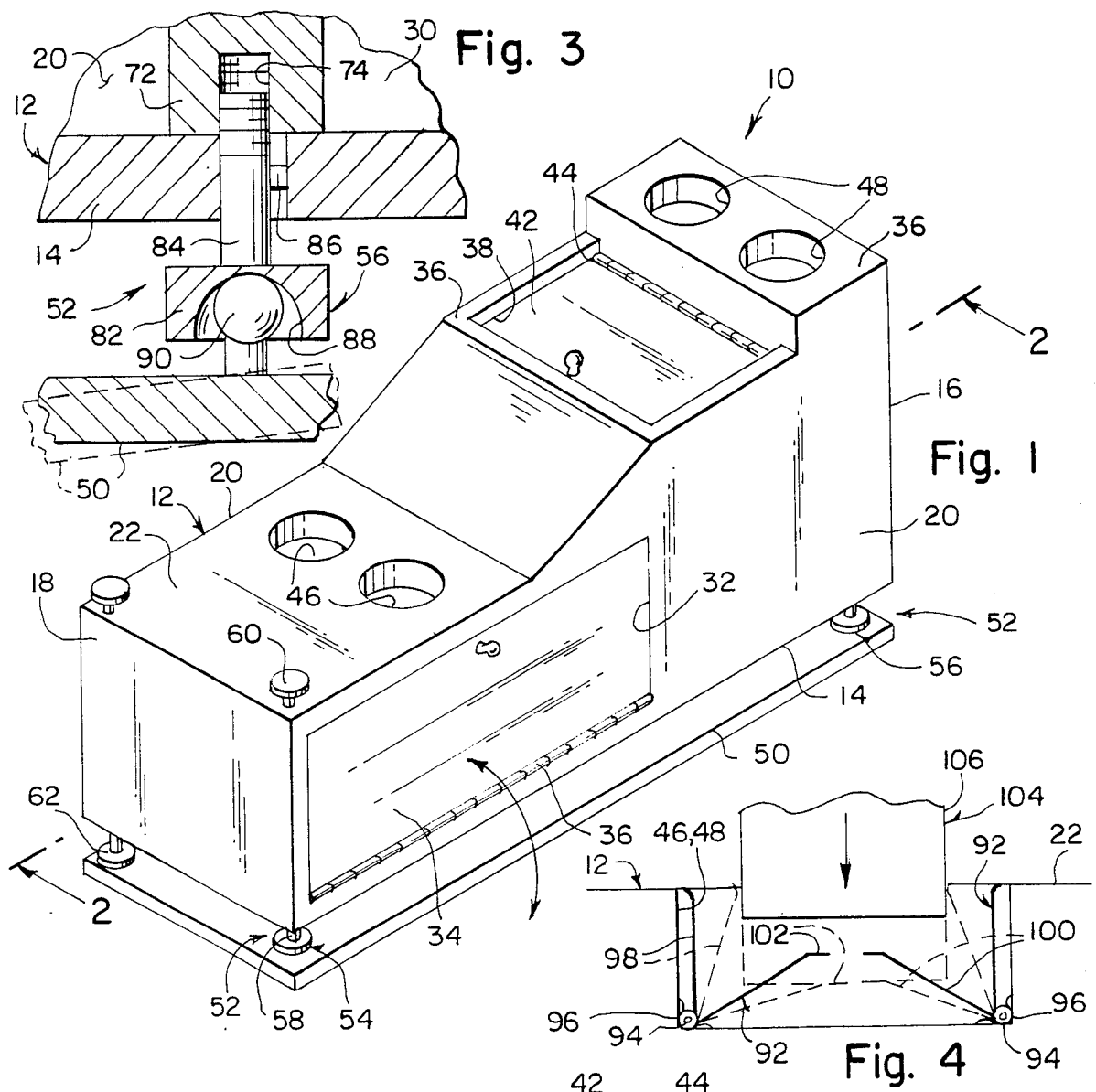
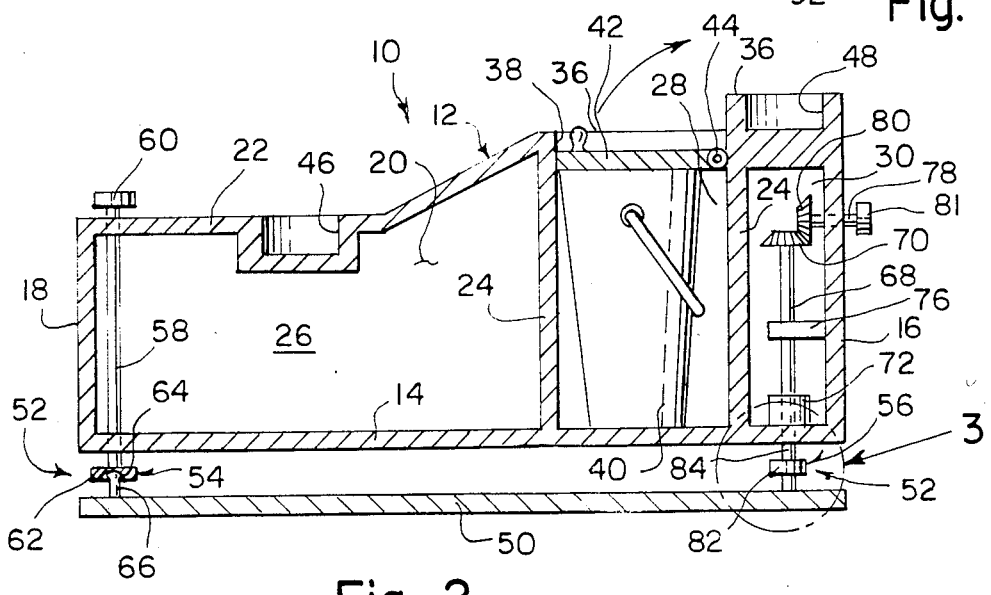

CONSOLE FOR A VEHICLE

BACKGROUND OF THE INVENTION

The instant invention relates generally to storage devices and more specifically it relates to a vehicle console especially for a van or the like.

Numerous storage devices have been provided in prior art that are adapted to be conveniently positioned within vehicles so as to be within reach for persons therein. For example, U.S. Pat. Nos. 3,177,033; 3,632,158 and 4,512,503 all are illustrative of such prior art. While these units may be suitable for the particular purpose to which they address, they would not be as suitable for the purposes of the present invention as heretofore described.

SUMMARY OF THE INVENTION

A primary object of the present invention is to provide a vehicle console that will overcome the shortcomings of the prior art devices.

Another object is to provide a vehicle console that will hold drinks, store a removable trash receptacle and contain an additional storage area for various articles.

An additional object is to provide a vehicle console that includes a leveling mechanism and drink holding gripping devices therein.

A further object is to provide a vehicle console that is simple and easy to use.

A still further object is to provide a vehicle console that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is a cross-sectional view taken along line 2—2 in FIG. 1.

FIG. 3 is an enlarged cross-sectional view as indicated by Numeral 3 in FIG. 2 showing the level foot in greater detail.

FIG. 4 is a diagrammatic cross-section of a modified drink holder with a gripping device therein.

DETAILED DESCRIPTION OF THE PREFERRED EMBODIMENTS

Turning now descriptively to the drawings, in which similar reference characters denote similar elements throughout the several views. FIGS. 1 and 2 illustrate a vehicle console 10 consisting of a base unit 12 that has a bottom panel 14, a rear panel 16, a front panel 18, two side panels 20, a top panel 22 and two inner panels 24 spaced apart and parallel to the rear panel 16 and the front panel 18 to form three chambers 26, 28 and 30 therebetween. The base unit 12 is dimensioned to fit between two front seats of a vehicle (not shown).

One of the side panels 20 has an opening 32 formed therein to provide access to the first chamber 26 between the front panel 18 and one of the inner panels 24 to store various items. A pivotal door 34 normally covering the side panel opening 32 is adapted to be pivoted at hinge 36 to a lowered open position. For steering wheels located on the left side, door 34 is located on the other side of the console.

The top panel 22 has a stepped portion 36 extending upwardly and rearwardly to the rear panel 16 which is higher than the front panel 18. The stepped portion 36 has an opening 38 formed therein to provide access to the second chamber 28 between the inner panels 24 to hold a removable trash receptacle 40. A pivotal lid 42 normally covering the top panel opening 38 is adapted to be pivoted at hinge 44 to a raised open position. The top panel 22 further has a first pair of circular recesses 46 formed therein adjacent the front panel 18 to hold drinks and a second pair of circular recesses 48 formed in the stepped portion 36 adjacent the rear panel 16 to hold drinks.

The vehicle console 10 further contains an elongated plate member 50 to sit upon the floor of the vehicle (not shown) and a mechanism 52 for leveling the base unit on the plate member 50 with respect to the floor of the vehicle.

The leveling mechanism 52 consists of a pair of front leveling units 54 and a pair of rear leveling units 56. Each of the front leveling units 54 extends vertically through one front corner of the base unit 12 and includes an elongated threaded shaft 58 having a top knob 60 at top end and a front level foot 62 at bottom end. The front level foot 62 has a socket 64 therein and a ball member 66 on front corner of the plate member 50 cooperates with the socket 64 in the front level foot 62 so that the top knob 60 can be turned for vertical adjustment of the front leveling unit 54.

Each of the rear leveling units 56, as shown in FIGS. 2 and 3, extends vertically into one rear corner of the base unit 12 and horizontally through the rear panel 16. It includes a long vertical shaft 68 having a first bevel gear 70 at top end and an enlarged bottom end 72 with a threaded hole 74 therein. The vertical shaft is rotatably mounted at 76 to the rear panel 16 of the base unit 12. A short horizontal shaft 78 has a second bevel gear 80 cooperating with the first bevel gear 70 at one end and a rear knob 81 at other end. The horizontal shaft 78 extends through the rear panel 16. A rear level foot 82 that has a short vertical threaded arm 84 is keyed at 86 through the bottom panel 14 and threaded into the enlarged bottom end 72 of the long vertical shaft 68. The rear level foot 82 further has a socket 88 therein. A ball member 90 on rear corner of the plate member 50 cooperates with the socket 88 in the rear level foot 82 so that the rear knob 81 can be turned for vertical adjustment of the rear leveling unit 56.

As shown in FIG. 4, each of the circular recesses 46 and 48 in the top panel 22 contains a plurality of gripping devices 92 therein. Each of the gripping devices is spring biasedly hinged at 94 to outer lower perimeter 96 of the circular recess. Each of the gripping devices 92 includes a generally vertical arm 98 and a generally horizontal flexible arm 100 that has a flat portion 102. A drinking cup 104 when placed within the circular recess will press down on the flat end portions 102 of the flexible arms 100 allowing the vertical arms 98 to move inwardly against side 106 of the drinking cup 104 for gripping thereto.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A console adapted for mounting in a vehicle comprising:
   (a) a base unit with front and rear corners having a bottom panel, a front panel, a rear panel, two side panels, a top panel, and two inner panels spaced apart and parallel to said front panel and said rear panel to form three chambers therebetween, wherein said base unit is adapted to sit on the floor and fit between two front seats of a vehicle;
   (b) one of said side panels having an opening formed therein to provide access to said chambers to store various items and a pivotal door normally covering said side panel opening and adapted to be pivoted to a lowered position;
   (c) said top panel having a stepped portion extending upwardly and rearwardly to said rear panel, said rear panel being higher than said front panel, said stepped portion having an opening formed therein to provide access to said second chamber between said inner panels adapted to hold a removeable trash receptacle and a pivotal lid normally covering said top panel opening and adapted to be pivoted to a raised open position, said top panel further having a first pair of circular recesses formed therein adjacent said front panel to hold drinks and a second pair of circular recesses formed in said stepped portion adjacent said rear panel to hold drinks;
   (d) an elongated plate member having front and rear corners adapted to sit upon the floor of a vehicle and support said base unit:
   (e) means for leveling said base unit on said plate member with respect to the floor of the vehicle, wherein said leveling means comprises:
   (f) a pair of front levelling units, each of said front leveling units extending vertically through one front corner of said base unit and including an elongated threaded shaft with top and bottom ends having a top knob at said top end and a front level foot at said bottom end, said front level foot having a socket therein and a ball member on each front corner of said plate member to cooperate with said socket in said front level foot so that said top knob can be turned for vertical adjustment of said front leveling units; and
   (g) a pair of rear leveling units, each of said rear leveling units extending vertically into one rear corner of said base unit and horizontally through said rear panel and including a long vertical shaft having a top end with a first bevel gear at said top end and an enlarged bottom end with a threaded hole therein, said vertical shaft rotatably mounted to said rear panel of said base unit, a short horizontal shaft having ends and having a second bevel gear cooperating with said first bevel gear at one end and a rear knob at the other end, said horizontal shaft extending through said rear panel, and a rear level foot having a short vertical threaded arm being keyed through said bottom panel and threaded into said enlarged bottom end of said long vertical shaft, said rear level foot further having a socket therein and a ball member on each rear corner of said plate member to cooperate with said socket in said rear level foot so that said rear knob can be turned for vertical adjustment of one of said rear leveling units.

2. A console as recited in claim 1, wherein each of said circular recesses having outer lower perimeters in said top panel comprising a plurality of gripping devices therein, each of which is spring biasedly hinged to each said outer lower perimeter of said circular recess, each of said gripping devices includes a generally vertical arm and a generally horizontal flexible arm having a flat end portion whereby said vertical arms are adapted to move inwardly against a side of a drinking cup placed inside said circular recess to maintain said cup in stable position.

* * * * *